(12) United States Patent
Arvidson et al.

(10) Patent No.: US 8,652,570 B2
(45) Date of Patent: Feb. 18, 2014

(54) PROCESS FOR FORMING UNIDIRECTIONALLY ORIENTED FIBER STRUCTURES

(75) Inventors: Brian D. Arvidson, Chester, VA (US); Ashok Bhatnagar, Richmond, VA (US); Henry G. Ardiff, Chesterfield, VA (US); Ralf Klein, Midlothian, VA (US); Lori L. Wagner, Richmond, VA (US)

(73) Assignee: Honeywell International Inc., Morristown, NJ (US)

(*) Notice: Subject to any disclaimer, the term of this patent is extended or adjusted under 35 U.S.C. 154(b) by 721 days.

(21) Appl. No.: 11/600,456

(22) Filed: Nov. 16, 2006

(65) Prior Publication Data

US 2008/0118639 A1 May 22, 2008

(51) Int. Cl.
*B05D 3/12* (2006.01)

(52) U.S. Cl.
USPC ........ 427/175; 427/355; 427/371; 427/385.5; 427/393.5

(58) Field of Classification Search
USPC ........................................ 156/166
See application file for complete search history.

(56) References Cited

U.S. PATENT DOCUMENTS

| | | | | |
|---|---|---|---|---|
| 3,671,542 A | 6/1972 | Kwolek | | 524/157 |
| 3,737,352 A * | 6/1973 | Avis et al. | | 156/181 |
| 3,975,487 A | 8/1976 | Cottis et al. | | 264/210.6 |
| 4,118,372 A | 10/1978 | Schaefgen | | 528/190 |
| 4,137,394 A | 1/1979 | Meihuizen et al. | | 528/100 |
| 4,161,470 A | 7/1979 | Calundann | | 524/599 |
| 4,356,138 A | 10/1982 | Kavesh et al. | | 264/164 |
| 4,403,012 A | 9/1983 | Harpell et al. | | 428/290 |
| 4,413,110 A | 11/1983 | Kavesh et al. | | 526/348.1 |
| 4,440,711 A | 4/1984 | Kwon et al. | | 264/185 |
| 4,457,985 A | 7/1984 | Harpell et al. | | 428/224 |
| 4,495,017 A * | 1/1985 | Abe et al. | | 156/181 |
| 4,501,856 A | 2/1985 | Harpell et al. | | 525/423 |
| 4,535,027 A | 8/1985 | Kobashi et al. | | 428/364 |
| 4,541,884 A * | 9/1985 | Cogswell et al. | | 156/166 |
| 4,543,286 A | 9/1985 | Harpell et al. | | 428/288 |
| 4,563,392 A | 1/1986 | Harpell et al. | | 428/394 |
| 4,584,347 A | 4/1986 | Harpell et al. | | 525/119 |
| 4,599,267 A | 7/1986 | Kwon et al. | | 428/364 |
| 4,613,535 A | 9/1986 | Harpell et al. | | 428/113 |
| 4,623,574 A | 11/1986 | Harpell et al. | | 428/113 |
| 4,650,710 A | 3/1987 | Harpell et al. | | 428/263 |
| 4,681,792 A | 7/1987 | Harpell et al. | | 428/102 |
| 4,737,401 A | 4/1988 | Harpell et al. | | 428/252 |
| 4,737,402 A | 4/1988 | Harpell et al. | | 442/187 |
| 4,748,064 A | 5/1988 | Harpell et al. | | 428/113 |

(Continued)

FOREIGN PATENT DOCUMENTS

| | | |
|---|---|---|
| JP | 01-139837 | 6/1989 |
| JP | 01139837 | 6/1989 |
| JP | 05-177633 | 7/1993 |

*Primary Examiner* — Michael Cleveland
*Assistant Examiner* — Alex A Rolland (57) ABSTRACT

A process for forming a unidirectionally oriented fiber structure formed of high tenacity fibers. A plurality of yarns of high tenacity fibers are supplied, with the yarns being unidirectionally oriented. The yarns are coated with a liquid having a viscosity of about 5 to about 600 centipoises and tension is applied to the yarns. The yarns are passed through a fiber spreading device and the yarns are dried. The yarns are reduced in thickness and increased in width after passing through the fiber spreading device, with the fibers forming the yarns being spread apart, thus providing a relatively thin unidirectionally oriented fiber structure.

19 Claims, 4 Drawing Sheets

(56) References Cited

U.S. PATENT DOCUMENTS

| | | | |
|---|---|---|---|
| 4,820,568 A | 4/1989 | Harpell et al. | 428/113 |
| 4,861,650 A * | 8/1989 | Dahms | 442/179 |
| 4,883,700 A | 11/1989 | Harpell et al. | 428/113 |
| 4,916,000 A | 4/1990 | Li et al. | 428/105 |
| 4,953,234 A | 9/1990 | Li et al. | 2/412 |
| 4,975,321 A * | 12/1990 | Gentile et al. | 428/299.4 |
| 5,006,390 A | 4/1991 | Kavesh et al. | 428/105 |
| 5,061,545 A | 10/1991 | Li et al. | 428/195 |
| 5,112,667 A | 5/1992 | Li et al. | 428/113 |
| 5,124,195 A | 6/1992 | Harpell et al. | 428/152 |
| 5,149,391 A * | 9/1992 | Li et al. | 156/441 |
| 5,165,989 A | 11/1992 | Bhatnagar et al. | 428/245 |
| 5,167,876 A | 12/1992 | Lem et al. | 252/602 |
| 5,173,138 A | 12/1992 | Blauch et al. | 156/177 |
| 5,175,040 A | 12/1992 | Harpell et al. | 428/113 |
| 5,185,195 A | 2/1993 | Harpell et al. | 428/102 |
| 5,187,023 A | 2/1993 | Prevorsek et al. | 442/228 |
| 5,190,802 A | 3/1993 | Pilato | 428/111 |
| 5,196,252 A | 3/1993 | Harpell et al. | 428/102 |
| 5,286,833 A | 2/1994 | Bubeck et al. | 528/183 |
| 5,296,185 A | 3/1994 | Chau et al. | 264/205 |
| 5,330,820 A | 7/1994 | Li et al. | 428/105 |
| 5,356,584 A | 10/1994 | Bubeck et al. | 264/205 |
| 5,471,906 A | 12/1995 | Bachner, Jr. et al. | 89/36.05 |
| 5,534,205 A | 7/1996 | Faley et al. | 264/103 |
| 5,552,208 A | 9/1996 | Lin et al. | 428/113 |
| 5,587,230 A | 12/1996 | Lin et al. | 428/245 |
| 5,674,969 A | 10/1997 | Sikkema et al. | 528/183 |
| 5,677,029 A | 10/1997 | Prevorsek et al. | 428/113 |
| 5,702,657 A | 12/1997 | Yoshida et al. | 264/112 |
| 5,766,725 A | 6/1998 | Hogenboom et al. | 428/113 |
| 5,935,637 A * | 8/1999 | Caldwell et al. | 427/8 |
| 5,939,553 A | 8/1999 | Reichwein et al. | 546/250 |
| 5,945,537 A | 8/1999 | Sikkema | 546/307 |
| 6,040,050 A | 3/2000 | Kitagawa et al. | 428/364 |
| 6,040,478 A | 3/2000 | Sikkema et al. | 562/424 |
| 6,219,842 B1 | 4/2001 | Bachner, Jr. | 2/2.5 |
| 6,248,676 B1 | 6/2001 | Dischler | 442/217 |
| 6,268,301 B1 | 7/2001 | Dalman et al. | 442/101 |
| 6,642,159 B1 * | 11/2003 | Bhatnagar et al. | 442/134 |

* cited by examiner

PROCESS FOR FORMING UNIDIRECTIONALLY ORIENTED FIBER STRUCTURES

BACKGROUND OF THE INVENTION

1. Field of the Invention

This invention relates to a process for forming fibrous structures including unidirectionally oriented fibers, as well as composite structures based on such fibrous structures.

2. Description of the Related Art

Various unidirectionally oriented fiber structures are known. These structures comprise a plurality of commonly aligned fibers which extend in a general co-planar relationship. Such structures formed from high tenacity fibers have found significant usage in ballistic, structural and other applications. In one typical structure, a plurality of oriented fiber structures are formed into a multi-ply composite in which adjacent plies are oriented at an angle with respect to each other. Two or more of the adjacent plies may be laminated to each other, and a plurality of such laminated plies are formed into a composite structure.

The oriented fiber structures are typically coated or impregnated with a matrix resin, which may be a thermoplastic, thermosetting or elastomeric material. Such composite structures have been successfully used in ballistic resistant products such as body vests, structural panels and the like.

It would be desirable to provide a unidirectionally oriented fiber structure which had improved uniformity, which may result in improved ballistic or structural properties.

SUMMARY OF THE INVENTION

In accordance with this invention, there is provided a process for forming a unidirectionally oriented fiber structure comprising high tenacity fibers, the process comprising:

(a) supplying a plurality of yarns comprising a plurality of the high tenacity fibers, the yarns being arranged unidirectionally with respect to each other;
(b) coating the yarns with a liquid having a viscosity of from about 5 to about 600 centipoises;
(c) applying tension to the yarns;
(d) passing the yarns through a fiber spreading device; and
(e) drying the yarns;

whereby the yarns are reduced in thickness and increased in width after passing through the fiber spreading device and the fibers forming the yarns are spread apart so as to provide a relatively thin unidirectionally oriented fiber structure.

Also in accordance with this invention, there is provided a process for forming a composite fiber structure comprising at least one layer of unidirectionally oriented high tenacity fibers, the process comprising:

(a) supplying a plurality of yarns comprising a plurality of the high tenacity fibers, the yarns being arranged unidirectionally with respect to each other;
(b) coating the yarns with a liquid having a viscosity of from about 5 to about 600 centipoises;
(c) applying tension to the yarns;
(d) passing the yarns through a fiber spreading device;
(e) drying the yarns;

whereby the yarns are reduced in thickness and increased in width after passing through said fiber spreading device and the fibers forming the yarns are spread apart so as to provide a relatively thin unidirectionally oriented fiber structure; and (f) attaching the relatively thin fiber structure to another fiber structure.

In further accordance with this invention, there is provided a process for forming a unidirectionally oriented yarn comprising high tenacity fibers, the process comprising:

(a) supplying a yarn comprising a plurality of high tenacity fibers;
(b) coating the yarn with a liquid having a viscosity of from about 5 to about 600 centipoises;
(c) applying tension to the yarn;
(d) passing the yarn through a fiber spreading device; and
(e) drying the yarn;

whereby the yarn is reduced in thickness and increased in width after passing through the fiber spreading device and the fibers forming the yarn are spread apart.

The present invention provides a process of forming more uniform fibrous tape materials which provides a more uniform composite product for any intended application. It has been found that the viscosity of the liquid is a key factor in achieving an enhanced spread of the fibers in the yarns. By spreading the fibers, the unidirectionally oriented fiber structure is thinner since there are fewer fibers which lie on top of another fiber in a yarn. The result is a fiber tape product that has a reduced number of fibers that are not coplanar, and thus a thinner product is provided.

Since many products made from unidirectional prepregs are made from multiple layers of the prepreg that are cross-plied at various angles, the uniformity of the finished product is related to the uniformity of the unidirectional coated or impregnated tape. Furthermore, some finished products are enhanced by more layering within the finished composite product. The greater the spread of the fibers, the thinner the layers, which increases the number of layers within the finished composite product of a given weight. This factor is important in applications such as ballistic applications in order to enhance ballistic performance of multilayered composite structures.

BRIEF DESCRIPTION OF THE DRAWINGS

This invention will become more fully understood and further advantages will become apparent when reference is had to the following detailed description of the preferred embodiments of the invention and the accompanying drawings, in which.

DETAILED DESCRIPTION OF THE INVENTION

For the purposes of the present invention, a fiber is an elongate body the length dimension of which is much greater that the transverse dimensions of width and thickness. Accordingly, the term "fiber" includes monofilament, multifilament, ribbon, strip, staple and other forms of chopped, cut or discontinuous fiber and the like having regular or irregular cross-sections. The term "fiber" includes a plurality of any of the foregoing or a combination thereof. A yarn is a continuous strand comprised of many fibers or filaments. Preferably the yarns used in this invention are untwisted and are not entangled in any way.

The cross-sections of fibers useful herein may vary widely. They may be circular, flat or oblong in cross-section. They may also be of irregular or regular multi-lobal cross-section having one or more regular or irregular lobes projecting from the linear or longitudinal axis of the fibers. It is preferred that the fibers be of substantially circular, flat or oblong cross-section, most preferably substantially circular.

As used herein, the term "high tenacity fibers" means fibers which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material.

Preferably, the high tenacity fibers have tenacities equal to or greater than about 10 g/d, more preferably equal to or greater than about 16 g/d, even more preferably equal to or greater than about 22 g/d, and most preferably equal to or greater than about 28 g/d.

The yarns useful in the fibrous layers may be of any suitable denier, such as from about 50 denier to about 3000 denier, more preferably from about 75 to about 2000 denier. Still more preferably, the yarns have a denier of from about 200 to about 2000, more preferably from about 650 to about 1500 denier. Most preferably, the yarns are from about 650 denier to about 1500 denier. The selection is governed by considerations of ballistic effectiveness and cost. Finer yarns are more costly to manufacture, but can produce greater ballistic effectiveness per unit weight.

The number of fibers that comprise the yarns may vary widely and also depends on the desired denier of the yarn. The yarns may be formed from about 30 to about 2000 fibers, more preferably from about 90 to about 2000 fibers, and most preferably from about 120 to about 2000 fibers. Most preferably, the fibers are in the form of monofilaments.

High strength fibers useful in the yarns and fabrics of the invention include highly oriented high molecular weight polyolefin fibers, particularly high modulus polyethylene fibers and polypropylene fibers, aramid fibers, polybenzazole fibers such as polybenzoxazole (PBO) and polybenzothiazole (PBT), polyvinyl alcohol fibers, polyacrylonitrile fibers, polyamide fibers, polyester fibers, liquid crystal copolyester fibers, glass fibers, carbon fibers or basalt or other mineral fibers, as well as rigid rod polymer fibers, and mixtures and blends thereof. Preferred high strength fibers useful in this invention include polyolefin fibers, aramid fibers and polybenzazole fibers, and mixtures and blends thereof. Most preferred are high molecular weight polyethylene fibers, aramid fibers and polybenzoxazole fibers, and blends and mixtures thereof. The yarns may comprise a single type of fiber or blends of two or more fibers. Additionally, the yarns that form the fiber structure may be of the same or different types.

U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of weight average molecular weight of at least about 150,000, preferably at least about one million and more preferably between about two million and about five million. Such high molecular weight polyethylene fibers may be spun in solution (see U.S. Pat. No. 4,137,394 and U.S. Pat. No. 4,356,138), or a filament spun from a solution to form a gel structure (see U.S. Pat. No. 4,413,110, German Off. No. 3,004,699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding about 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers (also referred to as extended chain or high molecular weight polyethylene fibers) are preferred polyolefin fibers and are sold under the trademark SPECTRA® by Honeywell International Inc. of Morristown, N.J., U.S.A.

Depending upon the formation technique, the draw ratio and temperatures, and other conditions, a variety of properties can be imparted to these fibers. The tenacity of the polyethylene fibers are at least about 7 g/d, preferably at least about 15 g/d, more preferably at least about 20 g/d, still more preferably at least about 25 g/d and most preferably at least about 30 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

In the case of aramid fibers, suitable fibers formed from aromatic polyamides are described in U.S. Pat. No. 3,671, 542, which is incorporated herein by reference to the extent not inconsistent herewith. Preferred aramid fibers will have a tenacity of at least about 20 g/d, an initial tensile modulus of at least about 400 g/d and an energy-to-break at least about 8 J/g, and particularly preferred aramid fibers will have a tenacity of at least about 20 g/d and an energy-to-break of at least about 20 J/g. Most preferred aramid fibers will have a tenacity of at least about 23 g/d, a modulus of at least about 500 g/d and an energy-to-break of at least about 30 J/g. For example, poly(p-phenylene terephthalamide) filaments which have moderately high moduli and tenacity values are particularly useful in forming ballistic resistant composites. Examples are Twaron® T2000 from Teijin which has a denier of 1000. Other examples are Kevlar® 29 which has 500 g/d and 22 g/d as values of initial tensile modulus and tenacity, respectively, as well as Kevlar® 129 and KM2 which are available in 400, 640 and 840 deniers from du Pont. Aramid fibers from other manufacturers can also be used in this invention. Copolymers of poly(p-phenylene terephthalamide) may also be used, such as co-poly(p-phenylene terephthalamide 3,4' oxydiphenylene terephthalamide). Also useful in the practice of this invention are poly(m-phenylene isophthalamide) fibers sold by du Pont under the trade name Nomex®.

High molecular weight polyvinyl alcohol (PV-OH) fibers having high tensile modulus are described in U.S. Pat. No. 4,440,711 to Kwon et al., which is hereby incorporated by reference to the extent it is not inconsistent herewith. High molecular weight PV-OH fibers should have a weight average molecular weight of at least about 200,000. Particularly useful PV-OH fibers should have a modulus of at least about 300 g/d, a tenacity preferably at least about 10 g/d, more preferably at least about 14 g/d and most preferably at least about 17 g/d, and an energy to break of at least about 8 J/g. PV-OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of preferably at least about 10 g/d and an energy to break of at least about 8 J/g. PAN fiber having a molecular weight of at least about 400,000, a tenacity of at least about 15 to 20 g/d and an energy to break of at least about 8 J/g is most useful; and such fibers are disclosed, for example, in U.S. Pat. No. 4,535,027.

Suitable liquid crystal copolyester fibers for the practice of this invention are disclosed, for example, in U.S. Pat. Nos. 3,975,487; 4,118,372 and 4,161,470.

Suitable polybenzazole fibers for the practice of this invention are disclosed, for example, in U.S. Pat. Nos. 5,286,833, 5,296,185, 5,356,584, 5,534,205 and 6,040,050. Polybenzazole fibers are available under the designation Zylon® fibers from Toyobo Co.

Rigid rod fibers are disclosed, for example, in U.S. Pat. Nos. 5,674,969, 5,939,553, 5,945,537 and 6,040,478. Such fibers are available under the designation M5® fibers from Magellan Systems International.

Figure 1:
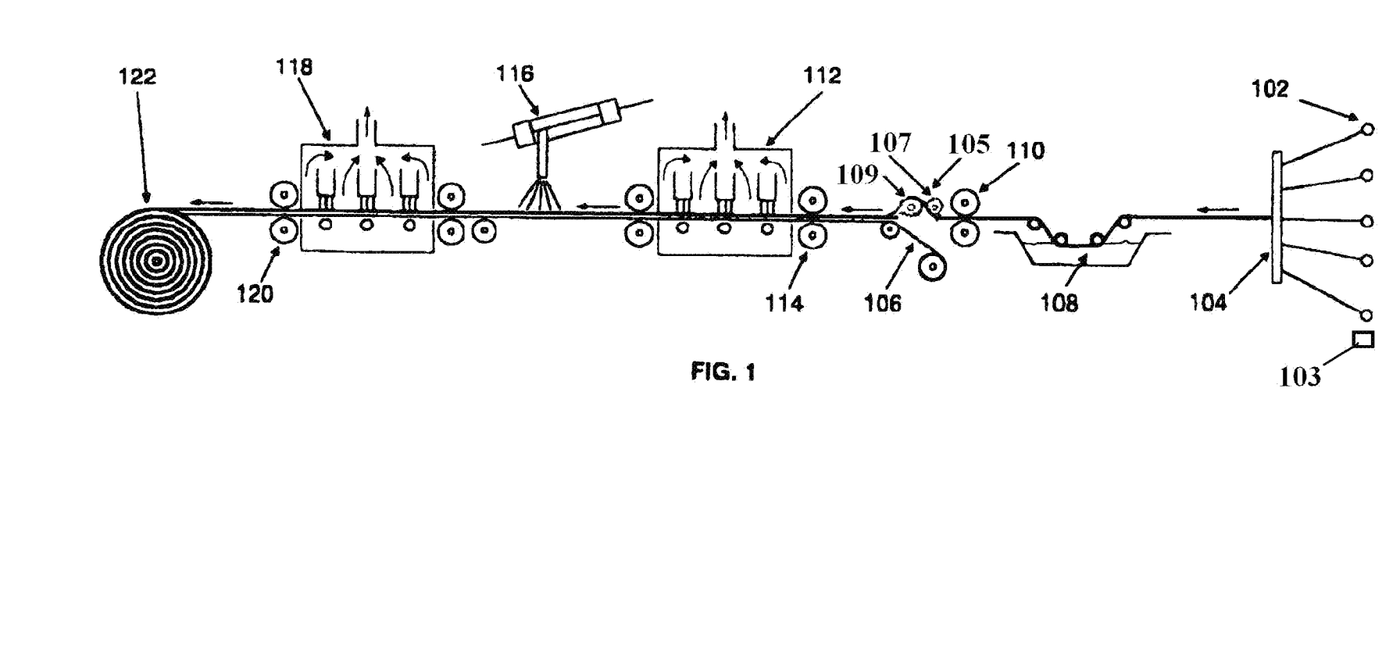
FIG. 1 is a schematic representation of a process for making a unidirectionally oriented fiber structure.

The overall process for forming unidirectionally oriented fiber structures is shown in FIG. 1 (a). Similar processes are described, for example, in U.S. Pat. Nos. 6,642,159 and 5,552,208, the disclosures of which are incorporated herein by reference to the extent not inconsistent herewith.

As shown in FIG. 1, yarns 102 are supplied from a creel and passed through a combing station 104 to form the unidirectional fiber network. A tension device 103 is preferably utilized to apply back tension on the plurality of yarns 102. Tension device 103 is shown as being a part of the creel 102 but it may be a part of the combing station 104 or otherwise located upstream of a coating tank 108. The fiber network is carried into coating tank 108 wherein it is coated or impregnated with a liquid, as is more specifically disclosed below. Other coating devices may be employed, such as a waterfall coater, a spray coater, roller coater, and the like.

The coated fiber network preferably is passed through a pair of rollers 110 which squeeze out excess liquid and spread the liquid composition substantially uniformly among and between the filaments. The coated yarns are passed through a fiber spreading device 105. Spreading device 105 is shown as a pair of spreading bars 107, 109. It should be understood that additional spreading bars may be employed and that other spreading devices may be used. Also, spreading device 105 may be placed in other locations, such as upstream of coating tank 108. As shown, yarns 102 may be pass beneath the first spreading bar 107 and then over the second spreading bar 109. The spreaded fiber network is then preferably placed on a carrier web 106, which may be a paper or a film substrate or any other suitable material which supports the fiber network and is preferably releasable therefrom. Nip rollers 114 may be used to control the layer thickness. The coated fiber network layer is dried, preferably by passing through a first heated oven 112. Alternatively, the coated fiber network may be air dried. In oven 112, the coated fiber network layer ("unitape") is subjected to sufficient heat to volatilize the liquid from the solids in the coating composition.

Spreading bars 107, 109 are preferably fixed bars, but they may be rotatable. Other spreading devices can be employed, such as rolls which rotate in a direction counter to that of the yarns or rolls that rotate in the same direction as the yarns but which rotate at a different speed than the yarns.

If desired, a surface coating may be applied to the top surface of the fiber network, such as by spraying a suitable material at spray station 116. The surface coating layer need not be continuous. It may be formed of discrete drops of spray, preferably uniformly distributed on the surface of the fiber network. Alternative to being applied by means of a spray, the surface coating layer may also be applied by running the fiber network under a roller (not shown) in contact with a reservoir containing the desired coating material, or other coating devices may be used. If a second coating is applied, the fiber network is passed through a second heated oven 118 to volatilize the liquid in the coating composition. Nip rollers 120 may be used to pull the carrier web and unitape through the system. The substrate and the consolidated unitape can then be wound into a continuous roll on roller 122, with either the nip rollers 120 or the wind up roller 122 providing tension on the unidirectionally oriented fiber structure.

Tension device 103 may be in the form of a brake on the creel pay off spindle or any other suitable tensioning device such as disk type tensioners, pin type tensioners, electronic feed back to the spindle brake mechanisms, dancer arm tensioners, and the like. It should be understood that other tensioning devices may be employed.

As pointed out above, in the process of the invention tension is applied to the yarns as they are being coated, and preferably throughout the entire process. The amount of tension that is applied would vary depending upon the type of fibers in the yarns, the yarn denier, tenacity, modulus, elongation, elasticity, filaments per yarn, denier per filament, propensity of the yarn to spread, and yarn finish. Typically, it is desired to have the overall tension on each yarn (as measured at the last spreader bar) to be in the range of about 100 to about 1000 grams, more preferably in the range of about 200 to about 800 grams. By providing a tension device on the front end of the process which acts as a back tension, it is possible to vary the tension of the incoming fiber which will vary the tension through the spreading device to achieve a tension on the last bar within the desired tension range. A lower overall tension is desired for less fiber damage, lower equipment costs and increased operational efficiency. The present invention makes it is possible to achieve more fiber spread with less tensions throughout the system.

As used herein, the term "coating" is used in a broad sense to describe a fiber network wherein the individual fibers either have a continuous layer of the matrix composition surrounding the fibers or a discontinuous layer of the matrix composition on the surface of the fibers. In the former case, it can be said that the fibers are fully embedded in the matrix composition. The terms coating and impregnating are interchangeably used herein.

It has been found that the type of liquid that is used to coat the yarns may vary widely. The liquid may be a thermoplastic, thermosetting, elastomeric or a hybrid or blended resin of such materials. The viscosity of the liquid is more important that the nature of the liquid itself.

Preferably, the coating liquid also acts as a matrix resin for the unidirectional fiber structure, but a resin matrix may be applied in a second step (such as via coating station 116). The coating liquid may be in the form of a solution, suspension, dispersion, emulsion or other physical form, and the solids content of the coating composition may also vary widely.

The coating may be formed from a wide variety of materials having the desired characteristics. In one embodiment, the materials as matrix resins possess initial tensile modulus (modulus of elasticity) equal to or less than about 6,000 psi (41.4 MPa) as measured by ASTM D638. More preferably, the coating has an initial tensile modulus equal to or less than about 2,400 psi (16.5 MPa). Most preferably, the coating material has initial tensile modulus equal to or less than about 1,200 psi (8.23 MPa). These resinous materials are typically thermoplastic in nature. It should be noted that all tensile moduli are determined on a dry sample of the coating composition.

Alternatively, the resin matrix may be selected to have a high tensile modulus when cured, as at least about $1 \times 10^6$ psi (6895 MPa). Examples of such materials are disclosed, for example, in the aforementioned U.S. Pat. No. 6,642,159.

As pointed out above, the coating liquid has a viscosity ranging from about to about 600 cps, more preferably from about 10 to about 300 cps, and most preferably from about 10 to about 250 cps. The viscosity of the liquid used as the coating material may be varied in a manner known in the art. For example, viscosity modifiers or thickening agents can be added to a coating composition. Alternatively, the solids content of the coating composition can be varied to provide the desired viscosity range. Additionally, the temperature of the coating composition may be adjusted (either heated or cooled) to provide the desired viscosity.

A wide variety of materials may be utilized as the coating composition (which is preferably the resin matrix for the composite). For example, any of the following elastomeric materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluoroelastomers, silicone elastomers, thermoplastic elastomers, thermoplastic polyurethanes, and copolymers of ethylene. Examples of thermosetting resins include those which are soluble in carbon-carbon saturated solvents such as methyl ethyl ketone, acetone, ethanol, methanol, isopropyl alcohol, cyclohexane, ethyl acetone, and combinations thereof. Among the thermosetting resins are vinyl esters, styrene-butadiene block copolymers, diallyl phthalate, phenol formaldehyde, polyvinyl butyral and mixtures thereof, as disclosed in the aforementioned U.S. Pat. No. 6,642,159. Preferred thermosetting resins include at least one vinyl ester, diallyl phthalate, and optionally a catalyst for curing the vinyl ester resin.

One preferred group of materials are block copolymers of conjugated dienes and vinyl aromatic copolymers. Butadiene and isoprene are preferred conjugated diene elastomers. Styrene, vinyl toluene and t-butyl styrene are also preferred conjugated aromatic monomers. Block copolymers incorporating polyisoprene may be hydrogenated to produce thermoplastic elastomers having saturated hydrocarbon elastomer segments. The polymers may be simple tri-block copolymers of the type $R-(BA)_x$ (x=3-150); wherein A is a block from a polyvinyl aromatic monomer and B is a block from a conjugated diene elastomer. One preferred resin matrix is an isoprene-styrene-isoprene block copolymer, such as Kraton® D1107 isoprene-styrene-isoprene block copolymer available from Kraton Polymer LLC.

The resin matrix may be a thermoplastic or thermosetting material, based on whether a "hard" or "soft" type of ballistic or other material is desired.

Preferably, the coating composition is an aqueous based resin or a solvent based resin. Alternatively, the coating composition may be a wax or other material that is heated to provide a hot melt which is then coated onto the yarns. Furthermore, powder materials could also be heated into a melt and then coated onto the yarns.

After application of the coating composition to the yarns, the high strength fiber network is consolidated to form a matrix composition/fibers combination. By "consolidating" is meant that the matrix material and the fiber network layer are combined into a single unitary layer. Consolidation can occur via drying, cooling, heating, pressure or a combination thereof.

The proportion of the coating material to fiber in the composite layers may vary widely depending upon the end use, and whether the coating material is intended to act as a matrix resin. The resin matrix material preferably forms about 1 to about 98 percent by weight, more preferably from about 5 to about 95 percent by weight, and most preferably from about 5 to about 40 percent by weight, of the total weight of the fibers and resin matrix.

In the situation where the coating liquid does not form the resin matrix, but it is desirable for the fibers to be spread, then other materials may be used. Examples of such coating liquids are water with appropriate viscosity modifiers or thickening agents such as starches, polyacrylic acid, polyvinyl alcohol and cellulosic resins and the like. Other materials that could be used are petroleum oils, viscous solvents such as glycerin, viscous solutions of low concentration high molecular weight materials, or solvents with thickening agents such as cellulosic materials, etc. The above are provided as examples but are no means a comprehensive list of materials that may be used within the desired viscosity range.

As mentioned above, the process of this invention provides relatively thin unidirectionally oriented fiber structure. By "relatively thin" is meant that the fiber structures are thinner than similar structures formed from fibers which have not been spread. Preferably, the thickness of each fiber structure ranges from the diameter of a single yarn to about five times the diameter of a single yarn. The thickness of each ply of the unidirectionally oriented fiber structure may be chosen depending upon the desired end use, as well as the number of plies in the final product. For example, each unidirectionally oriented fiber structure ply may have a thickness of from about 0.35 to about 3 mils (9 to 76 µm), and more preferably from about 0.35 to about 1.5 mils (9 to 38 µm).

Depending upon the desired end use application, the resulting unidirectional non-woven fabric may be employed as one ply in a multiply configuration. Preferably, one or more additional unidirectional fabrics are consolidated with the one ply to form a multiply configuration. For example, a two ply composite may be formed by cross-plying two units of the one ply structure, or a four ply composite may be formed by cross-plying three additional units of the one ply structure. Composites formed from the fiber structures of this invention preferably have at least two fiber layers of high tenacity fibers.

The successive plies are preferably rotated relative to one another, for example at angles of 0°/90°, 0°/90°/0°/90°, or 0°/45°/90°/45°/0° or at other desired angles. These plies are consolidated to form a multi-ply fiber structure. Such rotated unidirectional alignments are described, for example, in U.S. Pat. Nos. 4,457,985; 4,748,064; 4,916,000; 4,403,012; 4,623,574; and 4,737,402.

The fibers in each adjacent layer may be the same or different, although it is preferred that the fibers in adjacent layers of the composite be the same.

If desired, the one ply may be combined with one or more plies of a different type to form the desired multi-ply configuration. Such other plies may be formed of high tenacity fibers in the form or woven, knitted or other types of non-woven structures, such as felted fabrics. If the fabric of the fibrous layers is in the form of a woven fabric, it may be of any weave pattern, including plain weave, twill, satin, three dimensional woven fabrics, and any of their several variations. Plain weave fabrics are preferred and more preferred are plain weave fabrics having an equal warp and weft count. Woven fabrics may be woven with yarns having different fibers in the warp and weft directions, or in other directions.

Regardless of the physical form of each fiber structure, preferably, at least 50% by weight of the fibers in each layer are high tenacity fibers, more preferably at least about 75% by weight of the fibers are high tenacity fibers, and most preferably substantially all of the fibers are high tenacity fibers.

Depending upon the end use application, one or more plastic films may be utilized in combination with the fiber structures so as to reduce the friction between composites when several are placed upon each other. This is desirable in applications such as body armor in order to provide body armor that is more comfortable to wear. Any suitable plastic film may be employed, such as films made of polyolefins. Examples of such films are linear low density polyethylene (LLDPE) films, polyester films, nylon films, polycarbonate films and the like. These films may be of any desirable thickness. Typical thicknesses range from about 0.1 to about 1.2 mils (2.5 to 30 µm), more preferably from about 0.2 to about 1 mil (5 to 25 µm), and most preferably from about 0.3 to about 0.5 mils (7.5 to 12.5 µm).

Various constructions are known for fiber-reinforced composites used in impact and ballistic resistant articles such as helmets, panels, and vests. These composites display varying degrees of resistance to penetration by high speed impact from projectiles such as bullets, shrapnel and fragments, and the like. For example, U.S. Pat. Nos. 6,268,301, 6,248,676, 6,219,842; 5,677,029, 5,587,230; 5,552,208; 5,471,906; 5,330,820; 5,196,252; 5,190,802; 5,187,023; 5,185,195; 5,175,040; 5,167,876; 5,165,989; 5,124,195; 5,112,667; 5,061,545; 5,006,390; 4,953,234; 4,916,000; 4,883,700; 4,820,568; 4,748,064; 4,737,402; 4,737,401; 4,681,792; 4,650,710; 4,623,574; 4,613,535; 4,584,347; 4,563,392; 4,543,286; 4,501,856; 4,457,985; and 4,403,012 all describe ballistic resistant composites which include high strength fibers made from materials such as high molecular weight polyethylene, aramids and polybenzazoles. Such composites are said to be either flexible or rigid depending on the nature of their construction and the materials employed.

The consolidated unitape may be cut into discrete sheets and laid up into a stack for formation into the end use composite or they can be formed into a sub-assembly precursor which is subsequently used to form the end use composite. By "end use composite" is meant the integral multi-layer composite, which is an article of the invention such as a helmet or vehicle armor plate. As mentioned previously, the most preferred composite is one wherein the fiber network of each layer is unidirectionally aligned and oriented so that the fiber directions in successive layers are in a 0°/90° configuration.

In one embodiment, two fiber network layers are cross-plied in the 0°/90° configuration and then molded to form a sub-assembly precursor. The two fiber network layers can be continuously cross-plied, preferably by cutting one of the networks into lengths that can be placed successively across the width of the other network in a 0°/90° orientation. U.S. Pat. Nos. 5,173,138 and 5,766,725 describe apparatus for continuous cross-plying. The resulting continuous two-ply sub-assembly can then be wound into a roll with a layer of separation material between each ply. When ready to form the end use composite, the roll is unwound and the separation material stripped away. The two-ply sub-assembly is then sliced into discrete sheets, stacked in multiple plies and then subjected to heat and pressure in order to form the finished shape and cure the matrix resin.

The temperatures and/or pressures to which the fiber networks are exposed for molding vary depending upon the type of high strength fiber used. The end use composite for use in armor panels can be made by molding a stack of two layer sub-assemblies under a pressure of about 150 to 400 psi (1,030 to 2,760 kPa) preferably about 180 to 250 psi (1,240 to 1,720 kPa) and a temperature of about 104° C. to about 127° C. The end use composite for use in helmets can be made by molding a stack of two layer sub-assemblies under a pressure of about 1500 to 3000 psi (10.3 to 20.6 MPa) and a temperature of about 104° C. to about 127° C.

The unidirectionally oriented fiber structures formed by the method of this invention are characterized by yarns that are flattened out and fibers that are spread apart to a desired distance. By spreading the fibers apart, there is more room for the fibers to assume a more planar configuration resulting in a thinner fiber structure. For applications such as ballistic applications this is important since there are less fibers that are stacked upon each other. This results in more fibers that available to prevent penetration of a ballistic projectile. The thinner structure also permits the use of more layers of the fiber structure to provide increased ballistic protection without increasing the overall thickness of the protective garment or the like.

The following non-limiting examples are presented to provide a more complete understanding of the invention. The specific techniques, conditions, materials, proportions and reported data set forth to illustrate the principles of the invention are exemplary and should not be construed as limiting the scope of the invention.

EXAMPLES

Examples 1-9

A yarn formed from high tenacity aramid fibers was used. The yarn had a denier of 1000 and was formed from 1000 aramid filaments (available as Twaron 1100 dtex f1000 Type 2000 from Teijin). The yarn was fed from a spool into a container holding a coating composition. A weight of 6 ounces (170 grams) was applied to the spindle of the feed spool. The yarn was dipped into the coating composition and then fed into a spreading station which was formed from two stainless steel parallel metal bars of 1 inch (25.4 mm) diameter and spaced apart by 0.29 inches (7.37 mm). The yarn was fed under a first spreader bar and then over the second spreader bar. The yarn was wound up on a drum winder faced with a release film. The width of the yarn was measured at the second spreading bar and the tension was measured before the spreading bars. Tension was maintained on the yarn as it passed into the coating container and up through take-up.

A series of experiments were run with different coating compositions and different viscosities. In some cases the solids were varied in order to change the viscosity (as in solvent based resins such as Kratron/cyclohexane) and in other cases additives were used to increase the viscosities, while water was used to reduce the viscosity of aqueous based resins. For each composition and viscosity of liquid the fiber spread over the bars was measured.

In Example 1 (comparative), no liquid was employed and the fibers were spread in air. In Examples 2 and 3 (comparative), the liquid was water and cyclohexane, respectively. In Example 4 (comparative), the liquid was water with from 0.1 to 1.0 weight percent of a rheology modifier (Acrysol®).

In Example 5, various concentrations of Kratron® D1107 styrene-isoprene-styrene block copolymer) in cyclohexane were employed, which resulted in various viscosities. In Example 6, the liquid was a polyurethane resin (Sancure® 12929), by itself and with from 0.1 to 0.4 weight percent Acrysol®D. In Example 7, the liquid was an aqueous based styrene-isoprene-styrene resin (Prinlin® B7137AL) with a varying amount of Acrysol® modifier. In Example 8, the liquid was a polyurethane resin (Dispercoll® U53) with varying amounts of Acrysol® modifier. In Example 9, petroleum oils of various SAE ratings were used.

The results are shown in Table 1, below, which summarizes the solids percentage and the respective viscosity of the liquid resin. The results are also depicted graphically in FIG. 2.

TABLE 1

| Example | Liquid | Percent composition | Tension, g | Avg. Width in. (cm) | Viscosity, cP |
|---|---|---|---|---|---|
| 1 | Air | 100 | 500 | 0.1282 (0.3256) | 0.18 |
| 2 | Water | 100 | 490 | 0.1226 (0.3114) | 0.95 |
| 3 | Cyclohexane | 100 | 540 | 0.1239 (0.3417) | 2.10 |
| 4-1 | Water + modifier[a] | 0.1 | 620 | 0.1048 (0.2662) | 0.98 |
| 4-2 | Water + modifier[a] | 0.5 | 600 | 0.1117 (0/2972) | 0.99 |
| 4-3 | Water + modifier[a] | 1.0 | 620 | 0.1069 (0.2715) | 1.03 |
| 4-4 | Water + modifier[a] | Average | 613 | 0.1078 (2738) | 1.00 |
| 5-1[b] | SIS resin[b] | 4.0 | 560 | 0.1273 (0.3233) | 8.0 |
| 5-2 | SIS resin[b] | 7.4 | 520 | 0.1478 (0.3754) | 25.3 |
| 5-3 | SIS resin[b] | 11.5 | 580 | 0.1535 (0.3899) | 78.8 |
| 5-4 | SIS resin[b] | 14.5 | 580 | 0.1461 (0.3711) | 173.2 |
| 5-5 | SIS resin[b] | 17.5 | 600 | 0.1371 (0.3482) | 383.0 |
| 5-6 | SIS resin[b] | 21.5 | 580 | 0.1240 (0.3150) | 784.0 |
| 6-1 | Polyurethane[c] | 0.0 | 640 | 0.1388 (0.3526) | 16.5 |
| 6-2 | Polyurethane[c] | 0.1 | 620 | 0.1455 (0.3696) | 26.0 |
| 6-3 | Polyurethane[c] | 0.2 | 600 | 0.1448 (0.3678) | 41.5 |
| 6-4 | Polyurethane[c] | 0.3 | 600 | 0.1416 (0.3597) | 68.0 |
| 6-5 | Polyurethane[c] | 0.4 | 660 | 0.1355 (0.3442) | 106.0 |
| 7-1 | SIS resin[d] | 0.5 | 620 | 0.1421 (0.3609) | 76.5 |
| 7-2 | SIS resin[d] | 1.0 | 620 | 0.1538 (0.3907) | 117.5 |
| 7-3 | SIS resin[e] | 0 | 660 | 0.1579 (0.4011) | 171.0 |
| 7-4 | SIS resin[e] | 0.5 | 600 | 0.1588 (0/4034) | 251.5 |
| 7-5 | SIS resin[e] | 1.0 | 620 | 0.1539 (0.3909) | 550.0 |
| 8-1 | Polyurethane[f] | 0 | 660 | 0.1353 (0.437) | 7.8 |
| 8-2 | Polyurethane[f] | 0.1 | 620 | 0.1506 (0.3825) | 11 |
| 8-3 | Polyurethane[f] | 0.2 | 600 | 0.1532 (0.3891) | 14.5 |
| 8-4 | Polyurethane[f] | 0.3 | 580 | 0.1513 (0.3843) | 26 |
| 8-5 | Polyurethane[f] | 0.4 | 600 | 0.1507 (0.3828) | 28.6 |
| 8-6 | Polyurethane[f] | 0.6 | 620 | 0.1417 (0.3599) | 83.2 |
| 8-7 | Polyurethane[f] | 0.8 | 640 | 0.1402 (0.3561) | 137 |
| 8-8 | Polyurethane[g] | 0.2 | 620 | 0.1369 (0.3477) | 204.5 |
| 8-9 | Polyurethane[g] | 0.3 | 640 | 0.1334 (0.3388) | 434.0 |
| 8-10 | Polyurethane[g] | 0.4 | 660 | 0.1330 (0.3378) | 875.0 |
| 9-1 | SAE #10 | 100 | 600 | 0.1433 (0.3640) | 65.0 |
| 9-2 | SAE #20 | 100 | 580 | 0.1534 (0.3896) | 125.0 |
| 9-3 | SAE #30 | 100 | 640 | 0.1528 (0.3881) | 200.0 |
| 9-4 | SAE #40 | 100 | 760 | 0.1443 (0.3665) | 319.0 |
| 9-5 | SAE #90 | 100 | 800 | 0.1423 (0.3614) | 590.0 |

Notes:
[a] = modifier is Acrysol ® RM-8W ethylene oxide urethane rheology modifier from Rohm and Haas.
[b] = Kraton ® D1107 styrene-isoprene-styrene block copolymer from Kraton Polymers, weight percent in cyclohexane.
[c] = Sancure ® 12929 water based polyurethane from Noveon plus Acrysol ® RM-8W.
[d] = Prinlin ® B7137AL water based dispersion of Kraton ® D1107 styrene-isoprene-styrene resin (21% solids) + Acrysol ® RM-8W.
[e] = Prinlin ® B7137AL water based dispersion of Kraton ® D1107 styrene-isoprene-styrene resin (35% solids) + Acrysol ® RM-8W.
[f] = Dispercoll ® U53 water based polyurethane from Bayer (28% solids) plus Acrysol ® RM-8W.
[g] = Dispercoll ® U53 water based polyurethane from Bayer (45% solids) plus Acrysol ® RM-8W.

Figure 2:
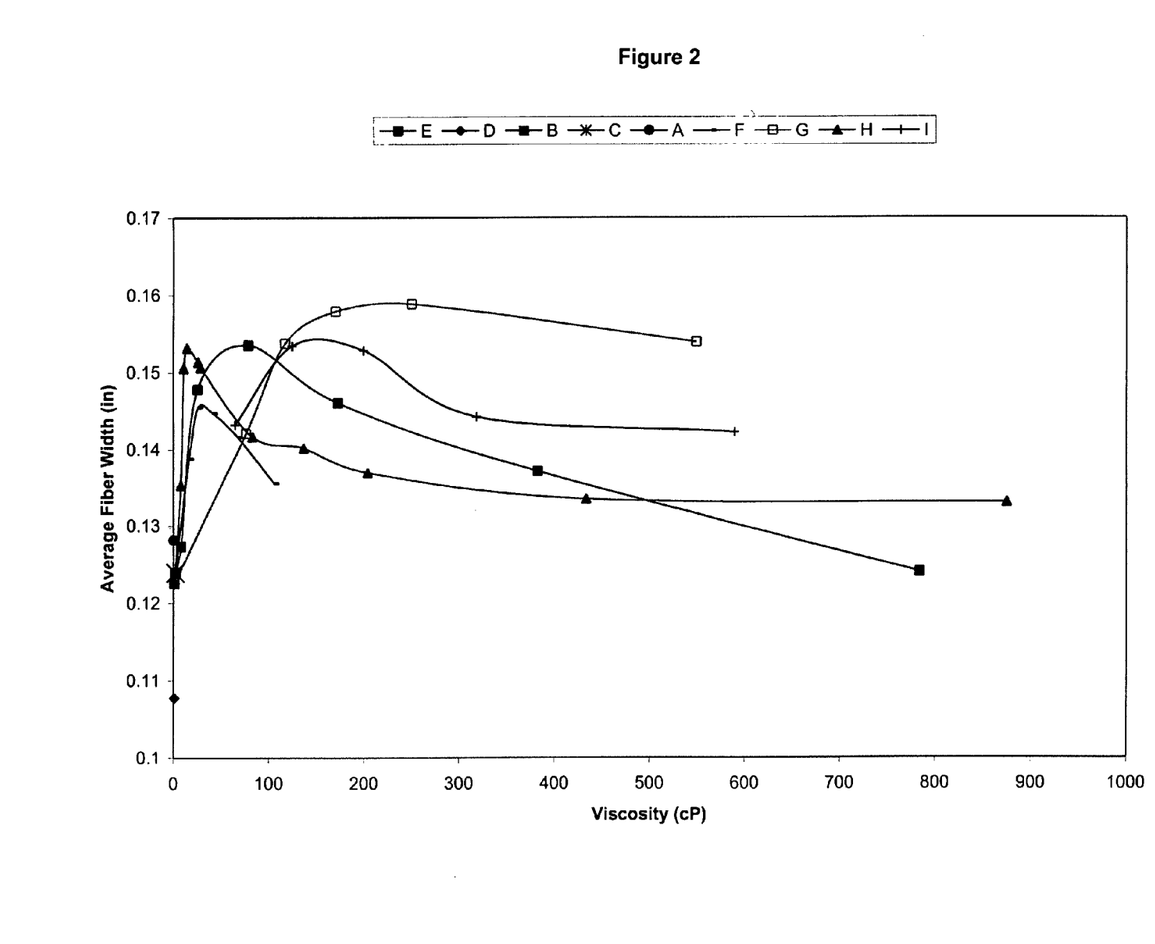
FIG. 2 is a graph of the fiber spread vs. viscosity for an aramid yarn.

Percent additives based on solids content of resin in liquid.
SAE=Society of Automotive Engineers The legend in FIG. 2 is as follows: A=air, B=water, C=cyclohexane, D=water with Acrysol, E=Kraton, F=Sancure with Acrysol, G=Prinlin with Acrysol, H=Dispercoll U53 with Acrysol, I=petroleum oil.

It can be seen that by treating the aramid fibers with a liquid having a viscosity in the range of this invention results in significant fiber spreading being achieved. Treatment of aramid fibers with a liquid having properties in accordance with this invention provides enhanced fiber spreading, compared with air, as well as water and other liquids not having the viscosity of the invention.

Examples 10-15

Examples 1-9 were repeated using a high tenacity polyethylene yarn (1300 denier formed of 240 filaments of Spectra® 1000 fiber) from Honeywell International Inc. The results are shown in Table 2 below, and are depicted graphically in FIG. 3.

TABLE 2

| Example | Liquid | Percent composition | Tension, g | Avg. Width in. (cm) | Viscosity, cP |
|---|---|---|---|---|---|
| 10 | Air | 100 | 450 | 0.1968 (0.5000) | 0.18 |
| 11 | Water | 100 | 320 | 0.1433 (0.3640) | 0.95 |
| 12 | Cyclohexane | 100 | 290 | 0.1500 (0.3810) | 2.10 |
| 13-1 | Polyurethane$^a$ | 0.0 | 390 | 0.1477 (0.3752) | 7.8 |
| 13-2 | Polyurethane$^a$ | 0.1 | 370 | 0.1399 (0.3553) | 11 |
| 13-2 | Polyurethane$^a$ | 0.2 | 460 | 0.1463 (0.3716) | 14.5 |
| 13-3 | Polyurethane$^a$ | 0.3 | 390 | 0.1399 (0.3553) | 26 |
| 13-4 | Polyurethane$^a$ | 0.4 | 440 | 0.1463 (0.3716) | 28.6 |
| 13-5 | Polyurethane$^a$ | 0.6 | 420 | 0.1458 (0.3703) | 83.2 |
| 13-6 | Polyurethane$^a$ | 0.8 | 460 | 0.1493 (0.3792( | 137 |
| 14-1 | SIS resin$^b$ | 4.0 | 360 | 0.1363 (0.3462) | 8.0 |
| 14-2 | SIS resin$^b$ | 7.4 | 380 | 0.1489 (0.3782) | 25.3 |
| 14-3 | SIS resin$^b$ | 11.5 | 360 | 0.1505 (0.3823) | 78.8 |
| 14-4 | SIS resin$^b$ | 14.5 | 430 | 0.1480 (0.3759) | 173.2 |
| 14-5 | SIS resin$^b$ | 17.5 | 440 | 0.1463 (0.3716) | 383.0 |
| 14-6 | SIS resin$^b$ | 21.5 | 450 | 0.1492 (0.3790) | 784.0 |
| 15-1 | SIS resin$^c$ | 0.0 | 520 | 0.1528 (0.3881) | 43.0 |
| 15-2 | SIS resin$^c$ | 0.5 | 520 | 0.1545 (0.3924) | 76.5 |
| 15-3 | SIS resin$^c$ | 1.0 | 490 | 0.1520 (0.3861) | 117.5 |
| 15-4 | SIS resin$^d$ | 0.0 | 500 | 0.1504 (0.3820) | 171.0 |
| 15-5 | SIS resin$^d$ | 0.5 | 480 | 0.1473 (0.3741) | 251.5 |
| 15-6 | SIS resin$^d$ | 1.0 | 480 | 0.1508 (0.3830) | 550.0 |

Notes
$^a$= Dispercoll ® U53 water based polyurethane from Bayer (28% solids) plus Acrysol ® RM-8W.
$^b$= Kraton ® D1107 styrene-isoprene-styrene block copolymer from Kraton Polymers, weight percent in cyclohexane.
$^c$= Prinlin ® B7137AL water based dispersion of Kraton ® D1107 styrene-isoprene-styrene resin (21% solids) + Acrysol ® RM-8W.
$^d$= Prinlin ® B7137AL water based dispersion of Kraton ® D1107 styrene-isoprene-styrene resin (35% solids) + Acrysol ® RM-8W.

Percent additives based on solids content of resin in liquid.

Figure 3:
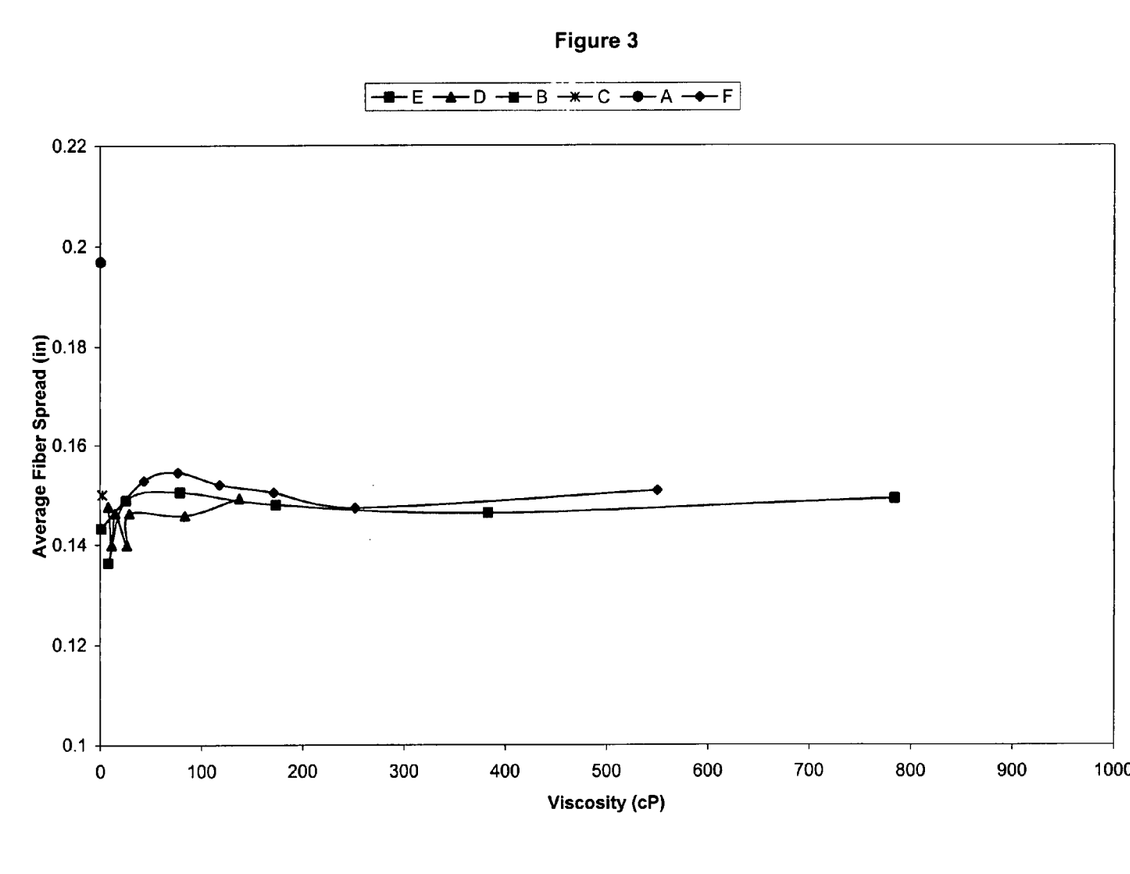
FIG. 3 is a graph of the fiber spread vs. viscosity for a high molecular weight polyethylene yarn.

The legend in FIG. 3 is as follows: A=air, B=water, C=cyclohexane, D=U53 with Acrysol, E=Kraton, F=Prinlin with Acrysol.

It can be seen that from the above examples that although high tenacity polyethylene yarns spread best in air, if a liquid medium is utilized then there is a benefit, to using viscosities in the range of about 5 to about 600 centipoises. Treatment of the yarns in a liquid is desirable especially when the liquid is used as the medium to provide a matrix resin to the high tenacity polyethylene yarns.

Examples 16-18

Examples 1-9 were repeated using a PBO yarn (1000 denier yarn 1110 dtex) available as Zylon® AS A1110T from Toyobo Co. The results are shown in Table 3 below, and are depicted graphically in FIG. 4.

TABLE 3

| Example | Liquid | Percent composition | Tension, g | Avg. Width in. (cm) | Viscosity, cP |
|---|---|---|---|---|---|
| 16 | Air | 100 | 450 | 0.1269 (0.3223) | 0.18 |
| 17 | Water | 100 | 370 | 0.1397 (0.3548) | 0.95 |
| 18-1 | SAE #10 | 100 | 540 | 0.1499 (0.3807) | 65.0 |
| 18-2 | SAE #20 | 100 | 540 | 0.1557 (0.3955) | 125.0 |
| 18-3 | SAE #30 | 100 | 620 | 0.1516 (0.3851) | 200.0 |
| 18-4 | SAE #40 | 100 | 660 | 0.1524 (0.3871) | 319.0 |
| 18-5 | SAE #90 | 100 | 680 | 0.1475 (0.3747) | 590.0 |

Figure 4:
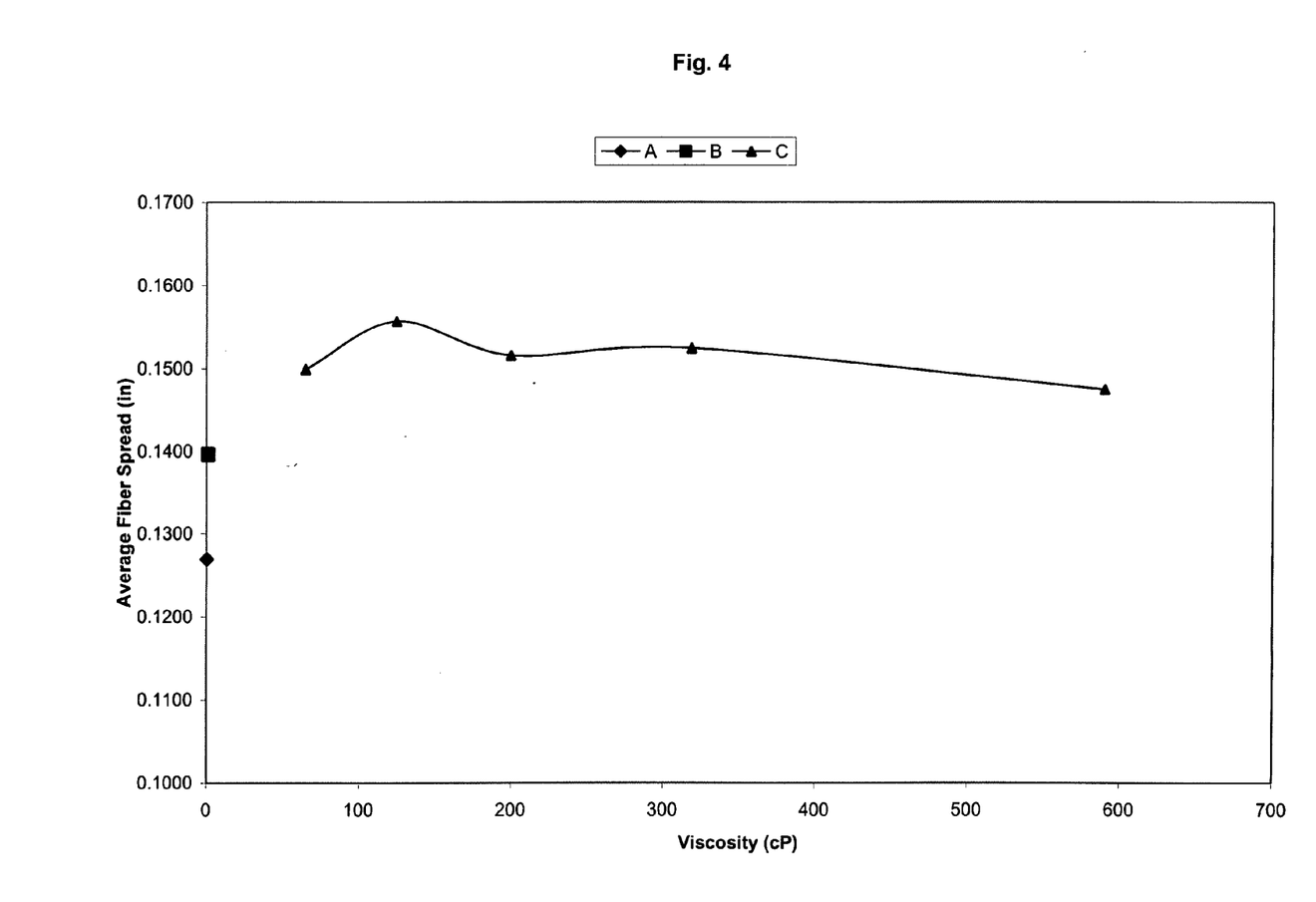
FIG. 4 is a graph of the fiber spread vs. viscosity for a PBO yarn.

The legend in FIG. 4 is as follows: A=air, B=water, C=petroleum oil.

It can be seen that by treating the PBO fibers with a liquid having a viscosity in the range of this invention results in significant fiber spreading being achieved. Compared with air and water, treatment of PBO fibers with a liquid in accordance with this invention provides enhanced fiber spreading.

It can be seen that the present invention provides a process for enhancing the spreading of high tenacity fibers by first coating them with a coating composition of a certain viscosity range. It has been unexpectedly found that when the yarns are coated with a liquid of this viscosity range that the fiber spreading is enhanced. This permits the production of thinner unidirectionally oriented fiber structures from the spread yarns. As a result, in ballistic applications, for example, the projectile to fiber interaction will be enhanced thereby increasing the ballistic capability of the final article made up of several unidirectional layers. By providing thinner layers, more layers can be provided for the same weight with the result being better ballistic properties of the finished article.

In addition, the coating of the yarns with a liquid as disclosed herein permits fiber spreading at lower overall tensions, thereby reducing fiber breakage as well as increasing operational efficiency.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A process for forming a relatively thin unidirectionally oriented fiber structure comprising high tenacity fibers, the process comprising the steps of:
    (a) supplying a plurality of yarns, each yarn comprising a plurality of high tenacity fibers, the yarns being arranged unidirectionally with respect to each other;
    (b) coating the yarns with a liquid having a viscosity of from about 5 to about 600 centipoise;
    (c) applying tension to said yarns;
    (d) passing the yarns through a fiber spreading device, whereby the yarns are reduced in thickness and increased in width; and
    (e) drying the yarns;
whereby said yarns are reduced in thickness and increased in width after passing through said fiber spreading device following said coating step (b) and preceding said drying step (e), thereby providing a relatively thin unidirectionally oriented fiber structure having a thickness of from about 0.35 to about 3 mils.

2. The process of claim 1, wherein the overall final tension on each yarn is in the range of from about 100 to about 1000 grams.

3. The process of claim 1, wherein variable tension is applied to the yarns throughout the process.

4. The process of claim 1, wherein the fiber spreading device comprises a plurality of fiber spreading bars.

5. The process of claim 1, further comprising the step of winding up the yarns after drying the yarns.

6. The process of claim 1, wherein the high tenacity fibers are selected from the group consisting of high molecular weight polyolefins, aramid, polyvinyl alcohol, polyacrylonitrile, polybenzazole, polyamide, polyester, liquid crystal polyesters, glass, carbon, basalt, mineral fibers and rigid rod fibers, and blends thereof.

7. The process of claim 1, wherein the high tenacity fibers are selected from the group consisting of high molecular weight polyethylene fibers, aramid fibers, polybenzazole fibers and blends thereof.

8. The process of claim 1, wherein the high tenacity fibers comprise aramid fibers.

9. The process of claim 1, wherein the high tenacity fibers have a tenacity of at least about 28 grams per denier.

10. The process of claim 1, wherein the viscosity ranges from about 10 to about 300 centipoise.

11. The process of claim 1, wherein the liquid comprises an aqueous based resin, a solvent based resin or a hot melt material.

12. The process of claim 1, wherein the liquid comprises a polyurethane resin.

13. The process of claim 1, wherein the liquid comprises a viscosity modifier.

14. The process of claim 1, wherein the liquid comprises solids that form a matrix resin for the fibers in the unidirectionally oriented fiber structure.

15. The process of claim 1, further comprising the step of cross-plying at least two plies of the unidirectionally oriented fiber structure.

16. A process for forming a composite fiber structure comprising at least one layer of unidirectionally oriented high tenacity fibers, the process comprising:
    (a) supplying a plurality of yarns, each yarn comprising a plurality of high tenacity fibers, the yarns being arranged unidirectionally with respect to each other, wherein the fibers are selected from the group consisting of high molecular weight polyethylene fibers, aramid fibers and polybenzazole fibers, and blends thereof;
    (b) coating the yarns with a liquid having a viscosity of from about 5 to about 600 centipoise;
    (c) applying tension to said yarns;
    (d) passing the yarns through a fiber spreading device whereby the yarns are reduced in thickness and increased in width, thereby providing a relatively thin unidirectionally oriented fiber structure;
    (e) drying the yarns;
whereby said yarns are reduced in thickness and increased in width after passing through said fiber spreading device following said coating step (b) and preceding said drying step (e);
and
    (f) attaching the relatively thin fiber structure to another fiber structure.

17. The process of claim 16, wherein the overall final tension on each yarn is in the range of from about 100 to about 1000 grams.

18. The process of claim 16, wherein said relatively thin unidirectionally oriented fiber structure has a thickness of from about 0.35 mil to about 3 mils.

19. A process for forming a relatively thin unidirectionally oriented fiber structure comprising high tenacity fibers, the process comprising the steps of:
    (a) supplying a plurality of yarns, each yarn comprising a plurality of high tenacity fibers, the yarns being arranged unidirectionally with respect to each other;
    (b) coating the yarns with a liquid having a viscosity of from about 5 to about 600 centipoise;
    (c) applying tension to said yarns;
    (d) passing the yarns through a fiber spreading device, whereby the yarns are reduced in thickness and increased in width; and
    (e) drying the yarns;
whereby said yarns are reduced in thickness and increased in width after passing through said fiber spreading device following said coating step (b) and preceding said drying step (e), thereby providing a relatively thin unidirectionally oriented fiber structure.

* * * * *